April 26, 1955
C. H. BETTMAN
PRODUCTION OF SUGAR-COATED PROCESSED
CEREALS AND NOVEL FOOD PRODUCT
Filed June 18, 1952
2,707,153
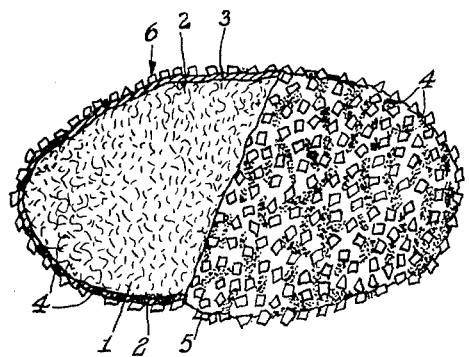
INVENTOR.
CARL HUGO BETTMAN
BY
ATTORNEY

United States Patent Office 2,707,153
Patented Apr. 26, 1955

2,707,153

PRODUCTION OF SUGAR-COATED PROCESSED CEREALS AND NOVEL FOOD PRODUCT

Carl Hugo Bettman, Hewlett, N. Y.

Application June 18, 1952, Serial No. 294,195

3 Claims. (Cl. 99—83)

The invention relates to the production of sugar-coated edible products, more especially such as are derived from processed cereals or other farinaceous products, for example, popcorn, puffed wheat, puffed oats, puffed rice, puffed corn, etc.; and has reference more particularly to the incorporation therewith of edible fruit and fruit juices.

In a copending application for United States Letters Patent filed by me August 28, 1947, Serial No. 771,080, and which has eventuated in U. S. Letters Patent No. 2,607,691, I have disclosed a method of preparing sugar-coated edible grains of puffed cereal; and the present invention has for an object a novel method whereby not only may the coating be applied but the flavor of the product be enhanced by the addition thereto of fruit particles or the liquor of the fruit, the same being incorporated in the novel product to provide a complete breakfast product—cereal, fruit and sugar.

A further object of the invention is to provide an integrated novel edible product comprising sugar-coated puffed cereal particles and fruit particles and/or solidified fruit liquor.

A still further object of the invention is to provide puffed cereal with discrete particles or crystals of sugar scattered profusely over an amorphous sugar coating of the individual grains and integrated with said coating together with dehydrated fruit particles and/or solidified fruit liquor.

In carrying out the invention, an aqueous sugar syrup is prepared of a viscosity such that the sugar approaches the stage of incipient crystallization; or, this syrup may be prepared of a mixture of sugar solution with fruit liquors. In making use of the fruit, either alone or with its liquor, the former is mashed; or, in the case of dehydrated fruit, is restored by the addition of water to afford a paste. In the case of canned fruit, the mixture of fruit and fruit liquor is similarly mashed. There is then added to the prepared syrup the cereal or other material as well as the fruit pulp, with suitable agitation of the mixture and with the application of heat thereto, this being continued until all moisture has been expelled. The mixture is thereby sufficiently softened and the surfaces properly coated, having adhering thereto the fruit particles as well as having them occluded therein. Thereupon the heating is discontinued and granular or "sanding" sugar is added with continuation of the agitation only, this added sugar not only preventing final coalesing of the particles into a compact mass but, due to the rapid embrittlement of the sugar, serves to effect a desirable separation of the individual grains from one another. The mass may then be removed and allowed to cool to room temperature, and any surplus sugar removed.

The nature of the invention, however, will best be understood when described in connection with the accompanying drawing which is a view on a greatly enlarged scale, in perspective and partly in section, of an individual puffed cereal grain having its surface coated with sugar and fruit particles, discrete sugar crystals being integrated therewith.

Referring to the drawing, the puffed or otherwise processed grains of cereal such as wheat, corn, rice, etc., are indicated by a grain 1, having the irregular surface or shell 2. Such puffed or otherwise processed grains are of an extremely porous nature and readily soluble in water, the shell 2 being weak and readily permeable by water or aqueous solutions, causing a grain to disintegrate rapidly in boiling liquids. Instead of using a so-called "puffed" grain of cereal and the like, cereals in granular form or flaked form (unless too brittle) may also be treated in the manner hereinafter set forth.

In accordance with the invention, an aqueous sugar solution, or rather syrup, is prepared in well-known manner including, for example, heating and agitation in the customary apparatus such as a revolving pan or kettle mixer (not shown). This syrup is boiled down until it attains a viscosity approaching the stage of incipient crystallization. It is then suitable to receive the cereal grains as well as the fruit pulp, the same to be added thereto under continued application of heat and agitation of the mixture until the syrup has wholly coated the cereal material and water has been substantially removed therefrom. The amount of cereal to be added may be on a basis of 3 lbs. of the latter for each ½ lb. more or less of sugar in the syrup, with fruit pulp in proportion to suit the taste. The quantity of the sugar, which may be sucrose, dextrose, glucose or mixtures thereof, may be varied to suit the thickness of the coating and the degree of sweetness desired.

The cereal grains are then added and continued heating and agitation applied to soften the entire mixture, whereupon the heating is discontinued and granular or so-called "sanding" sugar is added to the viscous mass. The amount of such additional sugar is to be ample to cover adequately the surfaces of the cereal grains and to effect the hardening of the entire sugar content of the mixture. After the addition of said "sanding" sugar, the mass in either case is removed for cooling; and it will be found as the cooling progresses that, due to the rapid embrittling of the syrup as a result of the added sugar, each cereal particle will have a thin, firmly adherent coating 3, together with fruit particles 4, provided over its entire surface, which coating closes the pores of a grain and renders it impervious to the usual deteriorating influences. Moreover, there will be studded over the entire surface and integrated therewith, by being embedded in part in the said fruited coating, crystals 5 of sugar with which at the same time further integrate the fruit particles 4 with the cereal and not only enhance as well the appearance of the product but provide the desired sugar content for consuption of the material as a food. Any surplus sugar is to be screened off. The preservative property of the sugar, furthermore, permits of storage of the novel product for extremely long periods of time without deterioration, and the crystals keep individual grain-fruit-sugar masses 6 from adhering to one another.

I claim:

1. The mehod of preparing sugar-coated, edible grains of cereal integrated with fruit particles, which comprises preparing an aqueous sugar syrup by heating and agitating the same to cause it to acquire a degree of viscosity approaching a state of incipient crystallization, adding to said syrup the whole grains of cereal and the fruit particles with agitation thereof and the application of heat to the mixture to coat the individual grains, to expel substantially all of the water from the mixture and subsequently to soften said mixture, adding granular sugar thereto in an amount to cover adequately the surfaces of the respective grains to disintegrate the mass of grains and to integrate the added crystals of sugar and the particles of fruit with the surface coatings of respective grains, and cooling and removing the separated grains.

2. In the method of claim 1, the step of adding an edible fruit liquor to the sugar syrup prior to the initial heating thereof.

3. A dry, edible cereal-fruit-sugar product comprising discrete grains of puffed cereal each with an amorphous sugar coating with adherent fruit particles, and discrete crystals of sugar distributed over and projecting from and integrated with said coating and with respective particles of fruit.

References Cited in the file of this patent

UNITED STATES PATENTS

| Number | Name | Date |
|---|---|---|
| 2,020,257 | Dickinson | Nov. 5, 1935 |
| 2,147,521 | Bustamante | Feb. 14, 1939 |
| 2,196,395 | Kellogg | Apr. 9, 1940 |
| 2,333,442 | Rex | Nov. 2, 1943 |
| 2,607,691 | Bettman | Aug. 19, 1952 |